Aug. 18, 1959   R. E. FRINK ET AL   2,900,464
METAL–CLAD SWITCHGEAR
Filed March 31, 1958   3 Sheets-Sheet 1

WITNESSES
John E. Heasley, Jr.
James F. Young

INVENTORS
Russell E. Frink &
Paul Olsson
BY
ATTORNEY

Aug. 18, 1959 R. E. FRINK ET AL 2,900,464
METAL-CLAD SWITCHGEAR
Filed March 31, 1958 3 Sheets-Sheet 2

Aug. 18, 1959   R. E. FRINK ET AL   2,900,464
METAL-CLAD SWITCHGEAR
Filed March 31, 1958   3 Sheets-Sheet 3
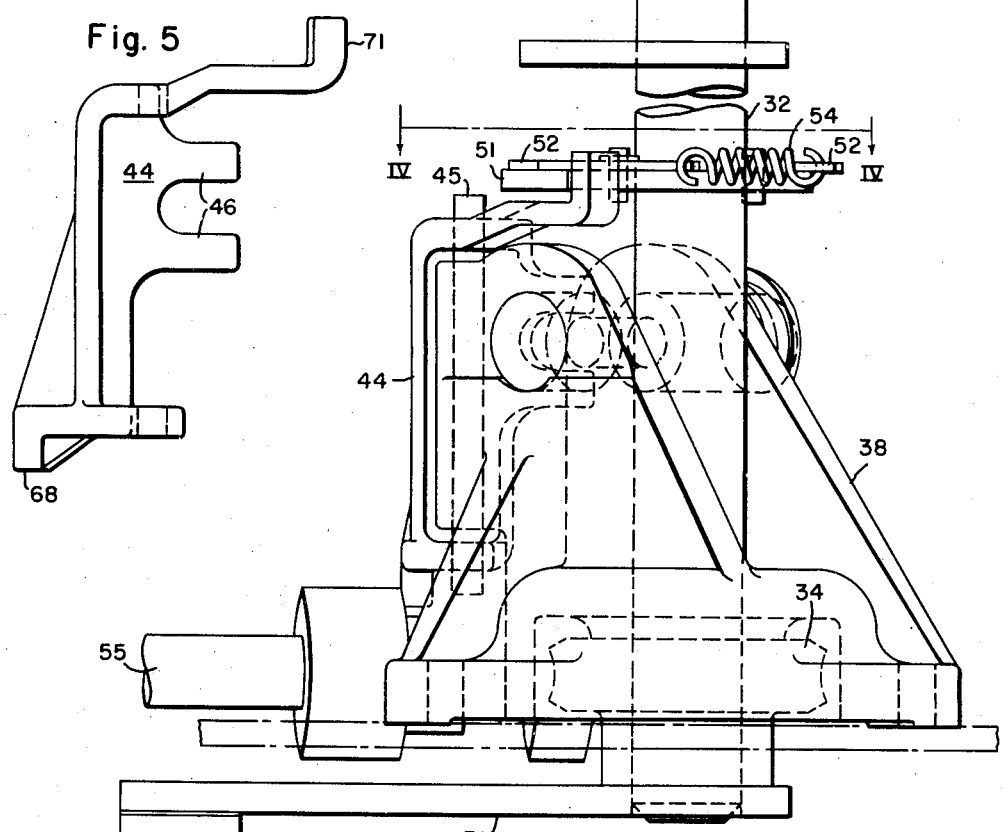
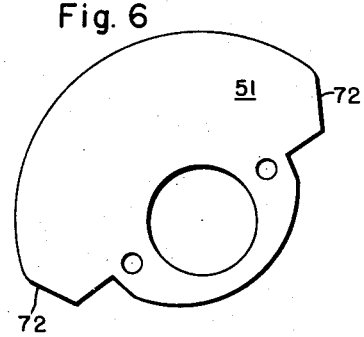
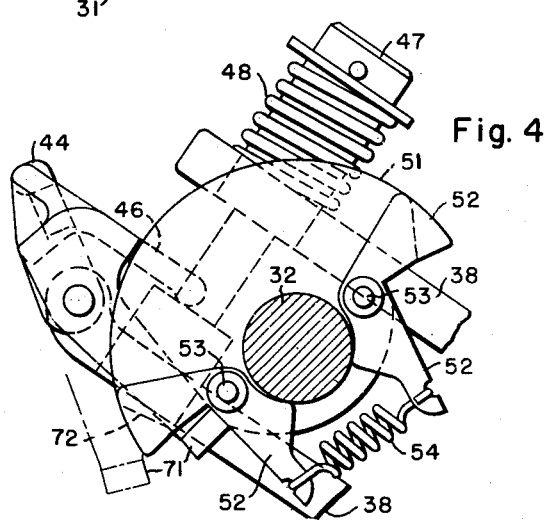

United States Patent Office 2,900,464
Patented Aug. 18, 1959

2,900,464

METAL-CLAD SWITCHGEAR

Russell E. Frink, Forest Hills, and Paul Olsson, Penn Township, Allegheny County, Pa., assignors to Westinghouse Electric Corporation, East Pittsburgh, Pa., a corporation of Pennsylvania Application March 31, 1958, Serial No. 725,287

10 Claims. (Cl. 200—50)

This invention relates, generally, to metal-clad switchgear and, more particularly, to levering and interlocking mechanisms for metal-clad switchgear having removable circuit breaker units disposed in cells or housings.

It is the usual practice to provide a mechanical levering mechanism for moving the removable breaker unit between the test and the connected positions in a switchgear cell. Interlocking devices have been provided which cooperate with the levering mechanisms to prevent moving the breaker unit from the test to the connected position and vice versa unless the contact members of the breaker are open, and to prevent closing the contact members of the breaker unless it is in either the connected or the test position. In previous interlocking devices the members could be so stressed that they failed mechanically or they could be jammed. Also, there was an indefinite zone between the interlocked and the free positions where operation was somewhat erratic.

An object of the invention is to provide an interlocking device for a removable circuit breaker unit which overcomes the foregoing deficiencies of prior devices.

Another object of the invention is to provide a levering mechanism and an interlocking device which cooperate efficiently in performing their proper functions.

A further object of the invention is to provide a combined interlocking and levering mechanism which cannot be jammed by improper operation on the part of the operator.

Other objects of the invention will be explained fully hereinafter or will be apparent to those skilled in the art.

In accordance with one embodiment of the invention, an interlocking lever and a spring-biased interlocking pin are so mounted on the housing for the gears which drive the levering mechanism for a removable circuit breaker unit that they cooperate to prevent operation of the levering mechanism while the contact members of the circuit breaker are closed. The interlocking members also prevent closing the contact members of the breaker while it is at any position between the test and the connected positions.

For a better understanding of the nature and the objects of the invention, reference may be had to the following detailed description, taken in conjunction with the accompanying drawings, in which:

Fig. 3 is an enlarged view, in plan, of the levering mechanism and the interlocking device;

Fig. 4 is an enlarged view, taken along the line IV—IV in Fig. 3;

Fig. 5 is an enlarged view of the interlocking lever; and

Fig. 6 is an enlarged view of an interlocking sector utilized in the structure.

Figure 1:
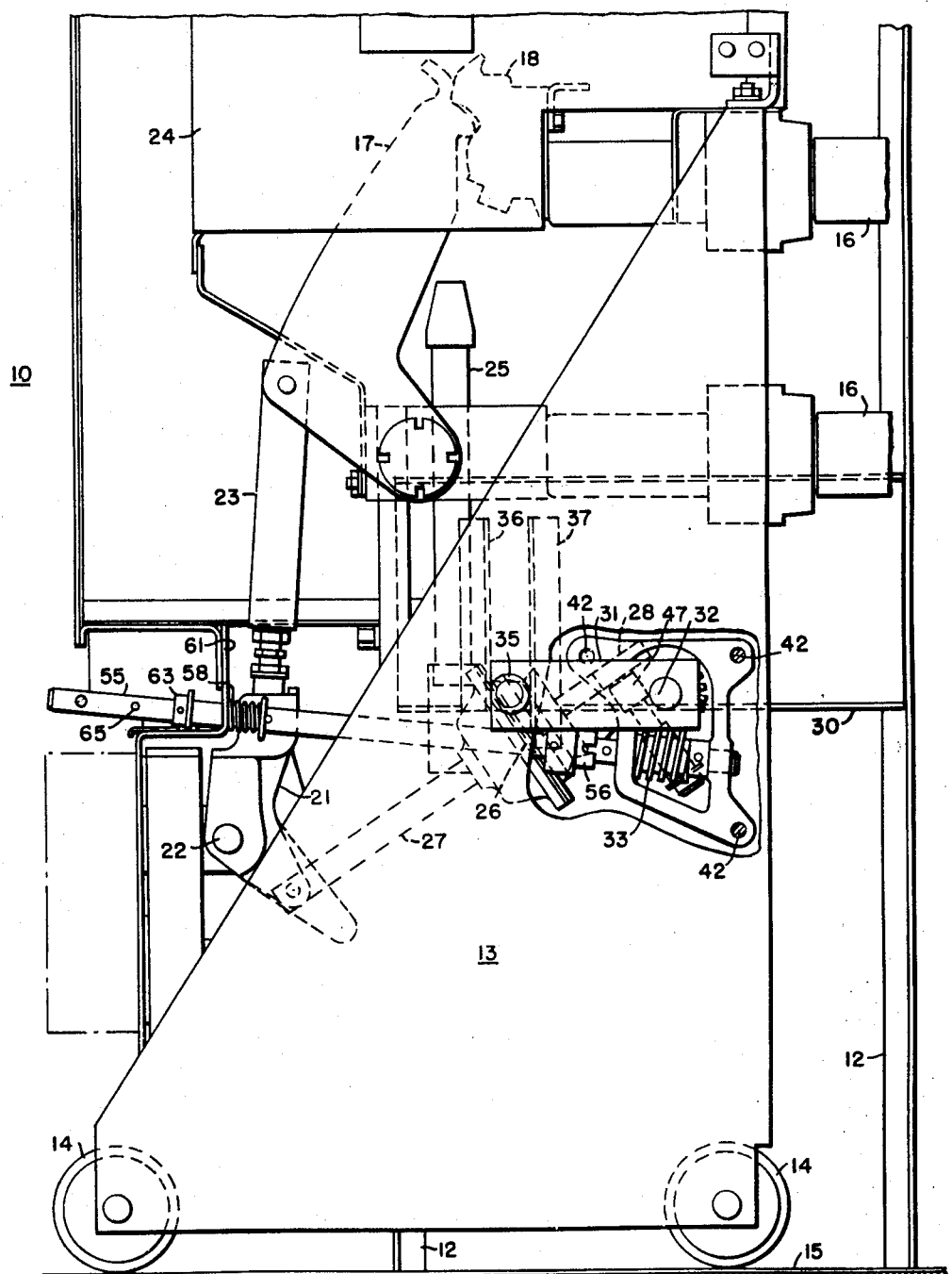
Figure 1 is a view, partly in side elevation and partly in section, of a portion of a metal-clad switchgear structure embodying the principal features of the invention.

Referring to the drawings, and particularly to Fig. 1, the structure shown therein comprises a portion of a metal-clad switchgear cell or housing 10 which may be constructed by securing sheet metal members 11 to angle frame members 12 in a manner well known in the art. A circuit breaker unit 13 is disposed in the cell and may be moved horizontally into and out of the cell on wheels 14 which run on rails 15 disposed at the bottom of the cell. In accordance with the usual practice, the breaker unit is provided with primary disconnecting contact members 16 which are disposed to engage stationary contact members (not shown) mounted in the cell. The disconnecting contact members may be of the type described in Patent No. 2,376,818, issued May 22, 1945, to M. J. Rubel.

The circuit breaker is provided with a movable contact member 17 which engages a fixed contact member 18. The movable contact member 17 is actuated by a lever 21 which is pivoted at 22 and is connected to the movable member 17 by a link 23. The lever 21 may be mechanically operated or it may be electrically operated by means of a solenoid mechanism to close the contact members in a manner well known in the art. A trip device may be provided for tripping the breaker mechanism to open the contact members in a manner well known in the art.

As shown, the contact members 17 and 18 are disposed in an arc chute 24. An auxiliary arc extinguishing device or puffer 25 is provided for assisting in extinguishing the arc drawn between the breaker contact members when they are opened. The puffer 25 has a diaphragm 26 associated therewith. The diaphragm 26 is actuated by a rod 27 which is connected to one arm of the lever 21. Thus, the rod 27 moves with the contact member 17 of the circuit breaker when it is opened and closed. An extension 28 is provided on the one end of the rod 27 for a purpose which will be explained hereinafter.

In accordance with the usual practice, a levering mechanism is provided for mechanically moving the circuit breaker unit 13 between the operating or connnected position and the test or disconnected position within the cell 10. In the present drawing the circuit breaker unit is shown in the connected or operating position in the cell.

In the present instance the levering mechanism comprises a pair of lever arms 31 which are secured to opposite ends of a horizontal shaft 32 rotatably mounted in the circuit breaker unit. The shaft 32 is rotated by a worm 33 and a worm gear 34 which is secured to the shaft 32. The worm 33 is driven in a manner which will be described more fully hereinafter.

A roller 35 is provided at the end of each one of the lever arms 31 and is disposed in a slot provided between angle members 36 and 37 which are secured to a channel member 30 which, in turn, is secured to angle frame members 12 at the side of the cell structure. Since a lever arm 31 and cooperating angle members 36 and 37 are provided at opposite sides of the breaker unit, a levering force is applied at both sides of the breaker unit.

It will be seen that when the shaft 32 is rotated to drive the arms 31 in a direction indicated by the arrow in Fig. 1, the rollers 35 move in the slots between the members 36 and 37, which, as previously explained, are secured to the sides of the cell structure, thereby moving the circuit breaker unit from the connected position to the test position in the cell. When the shaft 32 is rotated in the opposite direction, force is applied through the arms 31 to move the breaker unit from the test position to the connected position shown in the drawing, As shown by the broken lines in Fig. 2, each roller 35 moves through an angle slightly over 190° during the movement of the breaker unit from the connection position to the test position.

As previously stated, the one lever arm 31 and the worm gear 34 are both secured to one end of the shaft 32, preferably by welding. A gear housing 38, which is mounted on the shaft 32 before the worm gear 34 and the arm 31 are welded in place, carries the worm 33 which is secured to a worm shaft 39 rotatably mounted in the housing 38. The worm 33 may be pinned to the shaft 39 by means of a pin 41. The gear housing 38 may be attached to the side of the breaker unit 13 by means of bolts 42 disposed in holes 43 in the gear housing 38. An interlocking lever 44 is mounted in the gear housing 38 on a pin 45. The interlocking lever 44 has a bifurcated arm 46 which straddles a reduced portion of an interlocking or stop pin 47 which is slidably disposed in the gear housing 38. A compression spring 48, which is mounted on the stop pin 47 biases the pin in the opposite direction from which it is actuated by the interlocking lever 44.

As shown most clearly in Figs. 3 and 4, a sector or interlocking member 51 is also secured to the shaft 32. Two latch members 52 are pivotally attached to the sector 51 by pivot pins 53. The latch members 52 are biased by a spring 54 to the position shown in Fig. 4 in which their stop surfaces engage the shaft 32.

The levering mechanism is operated by a shaft 55 which is rotatably mounted in the breaker unit and is movable longitudinally of the shaft. A coupling member 56 is secured to one end of the shaft 55 by means of a pin 57. A compression spring 58 is mounted on the shaft 55 between a pin 59 and a frame member 61 of the circuit breaker unit. A collar 60 is disposed between the spring 58 and the shaft 55. An indicating device 62, which is pivotally mounted on the frame member 61, is actuated by a sleeve 63 which is secured to the shaft 55 by a pin 64. A pin 65 is provided in the shaft 55 for engagement by a manually operable crank (not shown) to operate the mechanism as will be described more fully hereinafter.

As previously stated, the circuit breaker unit is shown in the connected position in the cell 10. In order to move the breaker unit from the connected to the test position a crank is placed over the end of the shaft 55 engaging the pin 65 and the shaft 55 is pushed inwardly to cause the coupling 56 to engage a pin 66 in the worm shaft 39. A flange 67 on the coupling 56 engages an arm 68 of the interlocking lever 44. The lever 44 is actuated by movement of the coupling 56 to raise the stop pin 47 provided the contact members of the circuit breaker are open. If the contact members of the breaker are closed the extension 28 of the puffer rod 27 is directly above the upper end of the stop pin 47, as shown in Fig. 1, thereby preventing the stop pin from being raised. In this case the interlocking lever 44 will not permit the coupling 56 to move far enough to engage the pin 66 in the worm shaft 39.

However, if the contact members of the circuit breaker are open the stop pin 47 is free to rise since the extension 28 of the puffer rod 27 is withdrawn from above the stop pin 47. Thus, the coupling 56 can engage the pin 66 and the worm gear 34 can be driven by rotating the shaft 55, thereby driving the lever arms 31 to move the circuit breaker unit. A dog 71, which is a portion of the interlocking lever 44, moves from a position shown by the full lines in Fig. 4 to the position shown by the broken lines when the lever 44 is actuated about its pivot pin 45. When the shaft 32 rotates through a very small angle the sector 51 and latch member 52 move underneath the portion 71 of the lever 44, thereby holding the lever in its second position and keeping the stop pin 47 in its raised position to interfere with the puffer rod extension 28 and prevent the contact members of the breaker from being closed while the breaker is at any intermediate position between the test and the connected positions.

If the operating shaft 55 is moved longitudinally only far enough to cause the coupling 56 to barely engage the pin 66 in the worm shaft 39 it is evident that the dog 71 will not reach the extreme position shown by the broken lines in Fig. 4. In this case the dog 71 will ride up a sloping surface 72 of the sector plate 51 and push the latch member 52 out of the way so that no damage is done. After a small rotation of the sector plate 51, the dog 71 is in the same position that it would have been if the operation had been correctly performed by pushing the operating shaft 55 inwardly far enough to cause the coupling 56 to fully engage the pin 66. Thus, jamming or breaking the interlocking mechanism is prevented.

Figure 2:
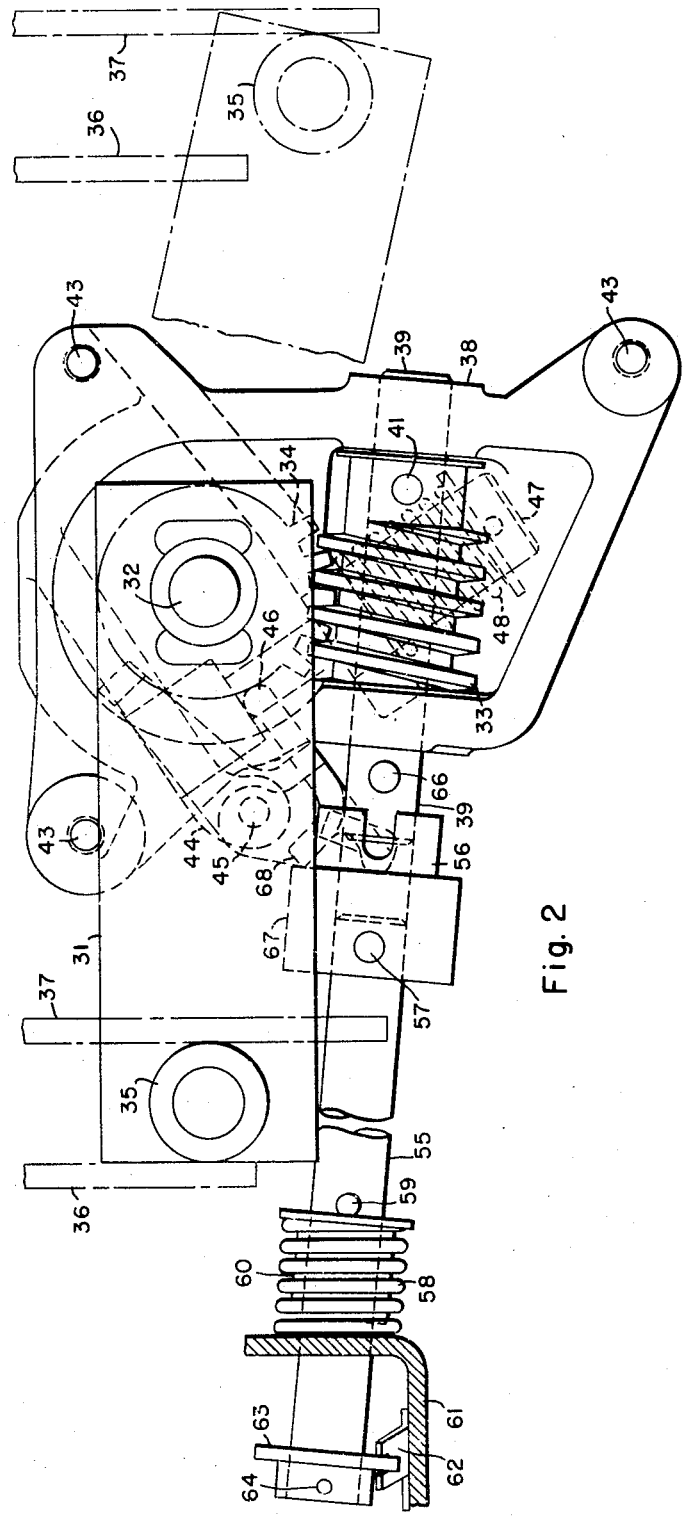
Fig. 2 is an enlarged view, partly in side elevation and partly in section, of the interlocking device and the levering mechanism for moving the breaker unit in the cell between the connected and the test positions.

To move the breaker unit to the test position the lever arms 31 are rotated through approximately 190° to reach the position shown by the broken lines in Fig. 2. In this position the sector plate 51 has rotated so that the dog 71 drops off the opposite latch plate 52 and the stop pin 47 returns to its initial position when the longitudinal pressure is released from the outer end of the shaft 55. The spring 48 is more powerful than the spring 58. Therefore, the spring 48 compresses the spring 58 and the shaft 55 moves outwardly, thereby permitting the stop pin 47 to be lowered to a position in which it will not interfere with the puffer rod 28. The collar 60 prevents the shaft 55 from being moved outwardly far enough to disengage the coupling 56 from the end of the shaft 39. The contact members of the breaker can now be closed.

As previously explained, the indicating device 62 is actuated by the sleeve 63 on the shaft 55. The device 62 may be utilized to indicate to the operator that the breaker unit is in a position in which the contact members of the breaker can be operated. When the shaft 55 is pushed inwardly, the indicating device indicates an "Interlocked" position of the breaker unit, in which case the contact members of the breaker cannot be closed. Thus, the operator is warned against attempting to operate the breaker contact members under improper conditions. The spring 58 prevents the shaft 55 from moving outwardly to operate the indicator 62 in case pressure is removed from the shaft before the levering operation is completed. Thus, the indicator shows "Interlocked" unless the interlocking lever 44 is disengaged from the raised portion of the sector plate 51.

It will be noted that the latch members 52 prevent the interlocking lever 71 from dropping off the sector plate 51 along the sloping surface 72 of the sector plate. Thus, the lever 71 is not released from the sector plate until the breaker unit is moved to the test position or to the connected position, as the case may be. Accordingly, there is no indefinite zone of travel during which improper operation of the interlocking device might be possible. As previously explained, the latch members permit the dog 71 of the interlocking lever to ride up the sloping surface of the sector plate during the initial part of movement of the breaker unit from either the test position or the connected position.

It will be understood that the lever mechanism is operated in one direction to move the breaker unit from the test position to the connected position and in the opposite direction to move the breaker unit from the connected to the test posiion. The levering mechanism and the interlocking devices are so constructed that they function equally well during both directions of operation.

From the foregoing description, it is apparent that the present invention provides a combined levering mechanism and interlocking device which function to prevent operation of the levering mechanism while the contact members of the circuit breaker are closed and to prevent the closing of the contact members of the circuit breaker while the levering mechanism is being operated to move the circuit breaker unit. Furthermore, the circuit breaker unit must be in the test position or the connected position before the contact members of the breaker can be closed. The breaker unit cannot be left in an intermediate position between the test and the connected positions and obtain operation of the contact members of the circuit breaker. The present structure has fewer parts than prior levering and interlocking mechanisms. Furthermore, the parts are more simple and of more rigid construction than the parts of prior mechanisms. The proper functioning of the interlocking device cannot be defeated by improper operation on the part of an operator.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. In a switchgear structure, in combination, a cell, a circuit breaker unit having openable and closable contact members disposed in the cell, a shaft horizontally disposed in the breaker unit, lever arms secured to said shaft and cooperating with the cell to move the breaker unit from one predetermined position to another predetermined position in the cell, gear means for rotating said shaft, a longitudinally movable shaft for driving said gear means, coupling means connecting the longitudinally movable shaft with said gear means, said coupling means being disposed at the end of the shaft adjacent to the gear means and actuated by longitudinal movement of said shaft, a lever directly engaged by said coupling means, a stop pin actuated by said lever, and a member movable with the contact members of the breaker, said member and said stop pin cooperating with said lever to prevent operation of said gear means when the contact members of the breaker are closed.

2. A combined levering and interlocking mechanism for a removable circuit breaker unit comprising a shaft horizontally disposed in the breaker unit, lever arms secured to opposite ends of the shaft for moving the breaker unit, gear means for rotating the shaft, a longitudinally movable shaft for driving said gear means, coupling means disposed at the end of the shaft adjacent to the gear means and actuated by longitudinal movement of said shaft to connect the shaft with the gear means, a lever directly engaged by said coupling means, a stop pin actuated by said lever, and a member movable with the contact members of the breaker as they are opened and closed, said member and said stop pin cooperating with said lever to prevent longitudinal movement of said shaft to connect the shaft with the gear means when the contact members of the breaker are closed.

3. A combined levering and interlocking mechanism for a removable circuit breaker unit comprising a shaft horizontally disposed in the breaker unit, lever arms secured to opposite ends of the shaft for moving the breaker unit, gear means for rotating the shaft, a longitudinally movable shaft for driving said gear means, coupling means disposed at the end of the shaft adjacent to the gear means and actuated by longitudinal movement of said shaft to connect the shaft with the gear means, a lever directly engaged by said coupling means, a spring-biased stop pin engaged by said lever, and a member movable with the contact members of the breaker as they are opened and closed, said member and said stop pin cooperating with said lever to prevent operation of said gear means when the contact members of the breaker are closed and to prevent closing the contact members while the gear means are being operated.

4. A combined levering and interlocking mechanism for a removable circuit breaker unit comprising a rotatable shaft horizontally disposed in the breaker unit, lever arms secured to opposite ends of the shaft for moving the breaker unit, gear means for rotating the shaft, a longitudinally movable shaft for driving said gear means, coupling means actuated by longitudinal movement of said shaft to connect the shaft with the gear means, a lever disposed adjacent to the rotatable shaft and engaged by said coupling means, a spring-biased stop pin engaged by said lever, and a member movable with the contact members of the breakers as they are opened and closed, said member blocking the moving of said stop pin by said lever to prevent connecting the longitudinally movable shaft to the gear means when the contact members of the breaker are closed, and said stop pin blocking said member to prevent closing said contact members while the longitudinally movable shaft is connected to said gear means.

5. A combined levering and interlocking mechanism for a removable circuit breaker unit comprising a rotatable shaft horizontally disposed in the breaker unit, lever arms secured to opposite ends of the shaft for moving the breaker unit, gear means for rotating the shaft, a gear housing for the gear means, a longitudinally movable shaft for driving said gear means, coupling means actuated by longitudinal movement of said shaft to connect the shaft with the gear means, a lever pivotally mounted on said gear housing adjacent to the rotatable shaft and engaged by said coupling means, a stop pin slidably disposed in said gear housing and actuated by said lever, a member movable with the contact members of the breaker as they are opened and closed, said member blocking the moving of said stop pin by said lever to prevent connecting the longitudinally movable shaft to the gear means when the contact members of the breaker are closed, and said stop pin blocking said member to prevent closing said contact members while the longitudinally movable shaft is connected to said gear means.

6. In a switchgear structure, in combination, a cell, a circuit breaker unit having openable and closable contact members disposed in the cell, a shaft horizontally disposed in the breaker unit, lever arms secured to said shaft and cooperating with the cell to move the breaker unit from one predetermined position to another predetermined position in the cell, gear means for rotating said shaft, a longitudinally movable shaft for driving said gear means, coupling means connecting the longitudinally movable shaft with said gear means, said coupling means being actuated by longitudinal movement of said shaft, a lever engaged by said coupling means, a stop pin actuated by said lever, a member movable with the contact members of the breaker, said member and said stop pin cooperating with said lever to prevent operation of said gear means when the contact members of the breaker are closed, and interlocking means driven by the horizontal shaft and directly engaging said lever to prevent closing the contact members of the breaker while it is between said predetermined positions.

7. In a switchgear structure, in combination, a cell, a circuit breaker unit having openable and closable contact members disposed in the cell, a shaft horizontally disposed in the breaker unit, lever arms secured to said shaft and cooperating with the cell to move the breaker unit from one predetermined position to another predetermined position in the cell, gear means for rotating said shaft, a longitudinally movable shaft for driving said gear means, coupling means connecting the longitudinally movable shaft with said gear means, said coupling means being actuated by longitudinal movement of said shaft, a lever engaged by said coupling means, a stop pin actuated by said lever, a member movable with the contact members of the breaker, said member and said stop pin cooperating with said lever to prevent operation of said gear means when the contact members of the breaker are closed, interlocking means driven by the horizontal shaft and engaging said lever to prevent closing the contact members of the breaker while it is between said predetermined positions, and spring-biased latch means disposed on said interlocking means to control movement of said lever.

8. In a switchgear structure, in combination, a cell, a circuit breaker unit having openable and closable contact members disposed in the cell, a shaft horizontally disposed in the breaker unit, lever arms secured to said shaft and cooperating with the cell to move the breaker unit from one predetermined position to another predetermined position in the cell, gear means for rotating said shaft, a longitudinally movable shaft for driving said gear means, coupling means connecting the longitudinally movable shaft with said gear means, said coupling means being actuated by longitudinal movement of said shaft, a lever engaged by said coupling means, a stop pin actuated by said lever, and a member movable with the contact members of the breaker, said member and said stop pin cooperating with said lever to prevent operation of said gear means when the contact members of the breaker are closed, and an interlocking member secured to the horizontal shaft for engaging said lever to retain the stop pin in position to prevent closing the contact members of the breaker while it is between said predetermined positions.

9. In a switchgear structure, in combination, a cell, a circuit breaker unit having openable and closable contact members disposed in the cell, a shaft horizontally disposed in the breaker unit, lever arms secured to said shaft and cooperating with the cell to move the breaker unit from one predetermined position to another predetermined position in the cell, gear means for rotating said shaft, a longitudinally movable shaft for driving said gear means, coupling means connecting the longitudinally movable shaft with said gear means, said coupling means being actuated by longitudinal movement of said shaft, a lever engaged by said coupling means, a stop pin actuated by said lever, and a member movable with the contact members of the breaker, said member and said stop pin cooperating with said lever to prevent operation of said gear means when the contact members of the breaker are closed, an interlocking member secured to the horizontal shaft for engaging said lever to retain the stop pin in position to prevent closing the contact members of the breaker while it is between said predetermined positions, and spring-biased latch members pivotally mounted on said interlocking member to control movement of said lever.

10. In a switchgear structure, in combination, a cell, a circuit breaker unit having openable and closable contact members disposed in the cell, a shaft horizontally disposed in the breaker unit, lever arms secured to said shaft and cooperating with the cell to move the breaker unit from one predetermined position to another predetermined position in the cell, gear means for rotating said shaft, a longitudinally movable shaft for driving said gear means, coupling means connecting the longitudinally movable shaft with said gear means, said coupling means being actuated by longitudinal movement of said shaft, a lever engaged by said coupling means, a stop pin actuated by said lever, and a member movable with the contact members of the breaker, said member and said stop pin cooperating with said lever to prevent operation of said gear means when the contact members of the breaker are closed, and interlocking member secured to the horizontal shaft for engaging said lever to retain the stop pin in position to prevent closing the contact members of the breaker while it is between said predetermined positions, spring-biased latch members pivotally mounted on said interlocking member to control movement of said lever, and an indicating device actuated by longitudinal movement of said longitudinally movable shaft.

References Cited in the file of this patent
UNITED STATES PATENTS

| | | |
|---|---|---|
| 2,554,510 | Spicer | May 29, 1951 |
| 2,760,020 | Claybourn | Aug. 21, 1956 |
| 2,792,462 | Kozlovic | May 14, 1957 |